Sept. 21, 1965 W. D. HOFER 3,206,920
RESILIENT MOUNTING FOR GRAIN PICK-UP TINES
Filed Feb. 13, 1963 2 Sheets-Sheet 1
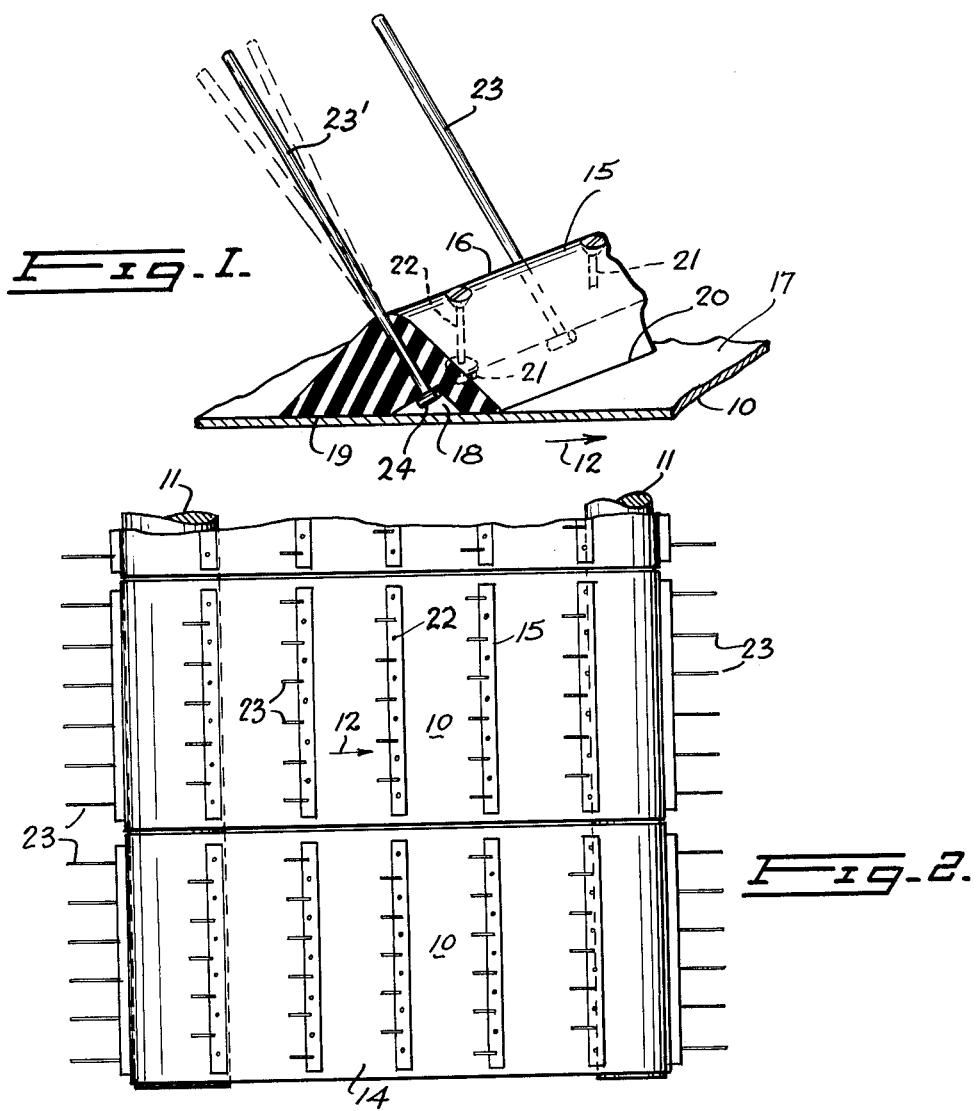
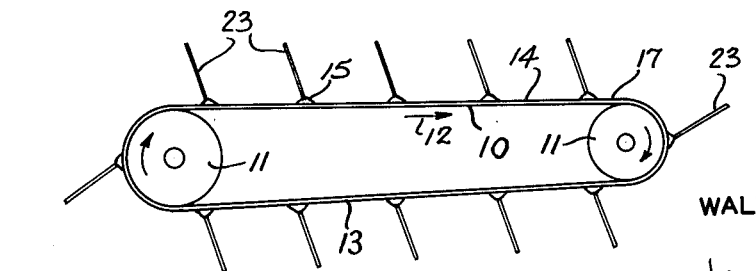
WALTER DAVID HOFER
INVENTOR Sept. 21, 1965　　　W. D. HOFER　　　3,206,920
RESILIENT MOUNTING FOR GRAIN PICK-UP TINES
Filed Feb. 13, 1963　　　2 Sheets-Sheet 2
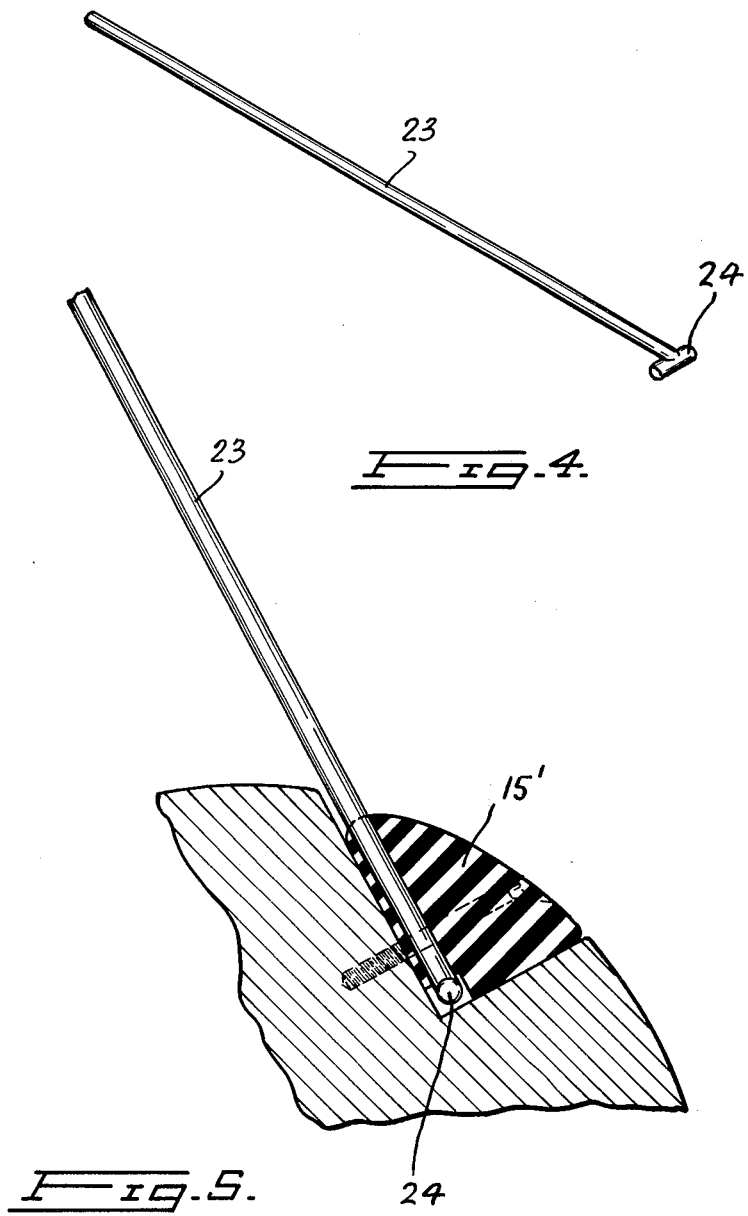
WALTER DAVID HOFER
INVENTOR United States Patent Office 3,206,920
Patented Sept. 21, 1965

3,206,920
RESILIENT MOUNTING FOR GRAIN
PICK-UP TINES
Walter David Hofer, Brocket, Alberta, Canada, assignor to Petroleum Rubber Ltd., Alberta, Canada, a body corporate of Canada
Filed Feb. 13, 1963, Ser. No. 258,300
Claims priority, application Canada, Feb. 14, 1962, 842,255
6 Claims. (Cl. 56—364)

This invention relates to new and useful improvements in attachments for grain pickup machines particularly pickup devices which utilize flexible fingers as tines to pick up grain from the ground and convey it towards further conveying and/or processing machinery.

It has been customary to provide such devices with wire tines of spring steel. One disadvantage of steel tines has been a tendency for them to become bent beyond their elastic limit when coming into contact with an obstruction. Another disadvantage that has been observed in practice has been a tendency for the tines to pick up small rocks and stones along with the grain. This is most undesirable, as such hard foreign substances may do considerable damage when thrown into the processing machinery. It is thought that this tendency to throw up heavier materials like stones with the grain may be due to the slowness of self damping of vibrations in the steel. Yet another disadvantage of steel has been a tendency for it to cause excessive wear on other softer parts with which it comes into contact, such as a rubber conveyor belt.

It has now been discovered that these disadvantages can be avoided by making the tines of a flexible, non-brittle synthetic resin that is subject to a minimum of permanent deformation, is resistant to wear and weathering, is relatively unaffected by environment (humidity, temperature) and which preferably has a longitudinal grain. The material so far found most satisfactory, as best fitting these requirements, is extruded nylon rod of the type sold under the trademark Nylatron. By extruding the rod instead of moulding it, a longitudinal grain is achieved which substantially increases the breaking strength.

Upon testing fingers made of such extruded nylon rod as pickup tines, it was found that, suprisingly, they exhibited entirely adequate abrasive durability. They were not appreciably inferior to steel in this regard, and yet, for some reason (the mechanism is not fully understood), they were substantially superior to steel in comparative freedom from the tendency to pick up foreign matter. This latter unexpected advantage in the use of extruded nylon tines (or tines of any material of generally like properties to extruded nylon) does not appear to be predictable from the properties of the material, and was only ascertained after substantial field tests, particulars of which are set out below.

A further advantage in the use of nylon tines is cheapness of manufacture in comparison with steel.

Further features of the preferred form of the invention comprise:

(a) Mounting the tines on bars of a resilent material such as rubber, as the means of securing the tines to the moving belt or drum of the machine (b) So mounting the tines that they are inclined downwardly and rearwardly where they engage the ground, in relation to their direction of travel.

The accompanying drawings illustrate, by way of example, a manner in which the present invention may be carried into practice.

FIGURE 1 is a fragmentary perspective view of a portion of the upper run of a belt for a grain pickup machine showing a portion of one of the tranverse bars with tines in place;

FIGURE 2 is a top plan view of a pickup belt assembly;

FIGURE 3 is substantially a side elevation of FIGURE 2;

FIGURE 4 is a view of a tine seen alone; and

FIGURE 5 shows an alternative method of mounting tines in a drum.

A plurality of pickup belts 10 mounted on rollers 11 in the conventional manner are driven in the direction of arrow 12 so that the lower span 13 of the belt moves in the direction of travel of the whole pickup device or machine. Each of the belts 10 is provided with a series of tine-holding bars 15 made of hard rubber and secured to extend transversely across the belt in spaced and parallel relationship as clearly shown in FIGURE 2.

Each of these transverse bars 15 is formed with a substantially triangular cross section as shown in FIGURE 1, having the rounded apex 16 of the triangle remote from the face 17 of the belt and being provided with a triangular recess 18 along the length of the bar 15 and on the base 19 thereof. This triangular recess 18 is provided adjacent the leading edge 20 of each bar 15. A plurality of fastening means such as rivets or bolt and nut assemblies 21, 22 pass through the bars 15 and the belt 10.

Tines 23 made as aforesaid of extruded nylon are each provided with an enlargement or head 24 on their inner ends such as a unitary cross-bar (see especially FIGURE 4) and are adapted to be inserted at an angle through the transverse bars 15. Each tine 23 extends from the triangular recess 18 in which its enlarged end 24 is housed, and protrudes from the bar 15 just forwardly of the apex 16 so that the major portion 23' of the tine extends clear of the bars 15 and at a rearwardly inclining angle from the plane of the belt in relation to the direction of travel thereof. As demonstrated in FIGURE 1 the portion 23' is long enough to permit the tine to flex.

It will be observed from FIGURE 2 that the tines of adjacent bars are staggered with respect to one another thus giving substantially full coverage of the entire surface of the belt during operation. It will also be observed that when the belt is operating, as shown in FIGURE 3 for example, the tines on the lower run 13 of the belt are in a trailing position with respect to the ground and that the resiliency thereof allows them to flex and return to their position as they pass over the surface of the ground.

FIGURE 5 shows an alternative bar 15' for mounting tines 23 on a drum 25 of a drum type grain pickup machine, the invention being equally applicable to drum type as to belt type machines. Indeed there may be many other variations in the size and shape of the tine-holding bar, such variations being adopted to suit the bar to mounting in the many different pickup machines available. The invention is equally applicable to combine pickups, hay baler pickups, side delivery rakes and pickup reels.

With regard to the hardness of the tine-holding bars, the best valve for this factor will readily be determined to suit each application. In general, it has been found advantageous to use harder rubber bar on drum type pickups than belt type pickups.

As indicated above, the superiority of tines constructed in accordance with the invention has been demonstrated by actual field tests. These tests, which are set out below, were conducted by the Agricultural Machinery Administration of the Departmentof of Agriculture at Regina, Saskatchewan, on two different machines, one a drum type machine, and the other of the belt type. In addition two different belt speeds were employed. The tests were carried out first with conventional metal tines and then with tines of extruded nylon made in accordance with the invention. All other factors were kept unchanged.

The table below sets out the pounds of rock picked up by the two different types of tine (segregated into small, medium and large sizes of rock), each test being conducted for operation over a given area of ground under uniform conditions of grain and rock distribution.

| Type of Pickup | Rock Size | Lbs. of rock picked up | |
|---|---|---|---|
| | | Nylon | Metal |
| Massey-Ferguson Drum Type | Small | 11.3 | 27.1 |
| | Medium | 8.7 | 97.2 |
| | Large | 1.4 | 310.7 |
| John Deere Belt operated, 200 r.p.m. | Small | 2.9 | 3.1 |
| | Medium | 9.1 | 16.1 |
| | Large | .3 | 3.2 |
| John Deere Belt operated, 400 r.p.m. | Small | 17.9 | 33.0 |
| | Medium | 14.5 | 137.5 |
| | Large | 1.8 | 18.7 |

The superiority of the nylon, particularly in regard to the larger size rocks, and particularly in regard to the faster operations, is plainly evident from these results.

Additional advantages observed have been reduced wear on the rubber belt type machine, and a generally lower noise level. It should also be mentioned that the nylon tines are substantially cheaper to produce (about a third of the cost of steel tines), thus keeping down initial and replacement costs to the farmer.

I claim:

1. In a harvester pick-up device having a movable tine carrier, the improvement comprising at least one elongate rubber bar for resiliently supporting headed resiliently flexible tines, said bar having a groove recessed in one face thereof and having a series of spaced openings extending between another face of said bar and a wall of said groove to receive respective tine shanks removably therein with the tine ends projecting from said bar and the tine heads seated in good groove, and means for detachably attaching said bar to said tine carrier with said grooved face in contact therewith to hold said tine heads captive between said bar and said carrier.

2. In a harvester pick-up device having a drum tine carrier, the improvement comprising at least one elongate rubber bar detachably attachable to said drum for resiliently supporting headed nylon tines, said bar having a groove recessed in one side thereof and having a series of openings spaced along said bar and extending between another face of said bar and a wall of said groove to receive respective tine shanks removably therein with the tine ends projecting from said bar and the tine heads seated in said groove, and means for detachably attaching said bar with said grooved face in contact with said drum to hold said tine heads captive between said bar and said drum.

3. In a harvester pick-up device including a tine carrier formed as a roll-supported movable endless belt having at least one transversely extending rubber bar supported by and projecting from one side of said belt, the improvement comprising a bar form of generally triangular cross-section whereof the face corresponding to the base of the triangle is flattened and has a groove recessed therein and whereof the apex portion is rounded, a series of openings extending through the bar between another face of the bar and a wall of said groove for removably receiving shank portions of resiliently flexible tine members each having one end enlarged and the other end projecting from said face, said tine members being mounted with the enlarged ends seated in said groove, and a series of further openings spaced along the length of the bar extending between the grooved face and said apex for receiving fasteners for removably attaching said bar to said belt with said grooved face in contact with said belt.

4. The improvement set forth by claim 1 wherein said tine heads are formed with unitary cross-bars and the tine material is extruded nylon.

5. The improvement set forth by claim 2 wherein said bar has two faces thereof disposed at right angles and said tine heads are formed with unitary cross-bars seated aligned with the length of said bar.

6. The improvement set forth by claim 3 wherein said tines are an extruded nylon.

References Cited by the Examiner

UNITED STATES PATENTS

| 2,286,095 | 6/42 | Innes | 56—364 |
| 2,627,159 | 2/53 | Russell | 56—364 |
| 2,704,150 | 3/55 | Scranton | 56—400 |
| 3,126,693 | 3/64 | Renn | 56—400 |

FOREIGN PATENTS 1,193,150   4/59   France.

ANTONIO F. GUIDA, *Acting Primary Examiner.*

ARNOLD RUEGG, *Examiner.*